United States Patent [19]

Nicholas et al.

[11] Patent Number: 4,752,868
[45] Date of Patent: Jun. 21, 1988

[54] REMOTE MASTER-SLAVE CONTROL METHOD

[75] Inventors: Dan H. Nicholas, Beaverton; Steven J. Birkel, Aloha, both of Oreg.

[73] Assignee: Tektronix, Inc., Beaverton, Oreg.

[21] Appl. No.: 840,166

[22] Filed: Mar. 17, 1986

[51] Int. Cl.[4] .............................. G05B 19/04
[52] U.S. Cl. ..................... 364/132; 364/550; 364/191; 364/481
[58] Field of Search ............... 364/132, 131, 188-193, 364/474, 513, 138, 139, 200 MS File, 900 MS File, 550, 481

[56] References Cited

U.S. PATENT DOCUMENTS

| 4,281,379 | 7/1981 | Austin | 364/132 |
| 4,288,849 | 9/1981 | Yoshida et al. | 364/132 |
| 4,497,019 | 1/1985 | Waber | 364/132 |
| 4,519,026 | 5/1985 | Nozawa et al. | 364/188 |
| 4,521,847 | 6/1985 | Ziehm et al. | 364/132 |
| 4,543,639 | 9/1985 | Inaba et al. | 364/193 |
| 4,549,276 | 10/1985 | Inaba et al. | 364/513 |

*Primary Examiner*—Joseph Ruggiero
*Assistant Examiner*—Allen MacDonald
*Attorney, Agent, or Firm*—Francis I. Gray

[57] ABSTRACT

A remote master-slave control method uses a single command line from a master instrument to a slave instrument. Commands executed at the master instrument are transmitted to the slave instrument via the single command line, and are in turn executed by the slave instrument only if an operator controlled input is "on" at the time of receipt of the command. For instrument setups a recall command from the master instrument will be executed by the slave instrument if the operator controlled input was "on" at the time the instrument setup was stored.

6 Claims, 4 Drawing Sheets

REMOTE MASTER-SLAVE CONTROL METHOD

BACKGROUND OF THE INVENTION

The present invention relates to remote control of instrumentation, and more particularly to a remote master-slave control method using a single command line between the master and the slave.

In the television industry to monitor video signals there are waveform monitors and vectorscopes which provide information about different aspects of the television video signal. Currently, these instruments do not communicate with each other so that if an operator wants to look at a particular signal the operator has to set up and/or make changes to both instruments separately. This is a time consuming operation and can lead to human errors resulting in erroneous interpretation of the displays on the respective instruments. One manufacture of these instruments has provided a hardwire line between these instruments for providing a line strobe from one instrument to the other with a single operator action at the first instrument, but there is no provision for limiting the strobe only to the first instrument, i.e., if the strobe is activated, it affects both instruments without choice by the operator.

What is desired is a method for controlling the operation of one instrument (slave) from the control panel of another instrument (master) while maintaining the ability to operate the instruments independently from each other.

SUMMARY OF THE INVENTION

Accordingly the present invention provides a remote master-slave control method for sending commands from a first instrument to a second instrument for execution by the second instrument, the second instrument executing the commands at the operator's option. A single command line connects a microprocessor in the first instrument with a microprocessor in the second instrument. The commands sent from the first instrument are executed by the second instrument unless the operator inhibits them at the second instrument. Further the second instrument can be preset and the setup stored for recall by the first instrument.

The objects, advantages and novel features of the present invention will be apparent from the following detailed description when read in conjunction with the appended claims and attached drawing.

DESCRIPTION OF THE PREFERRED EMBODIMENT

Figure 1:
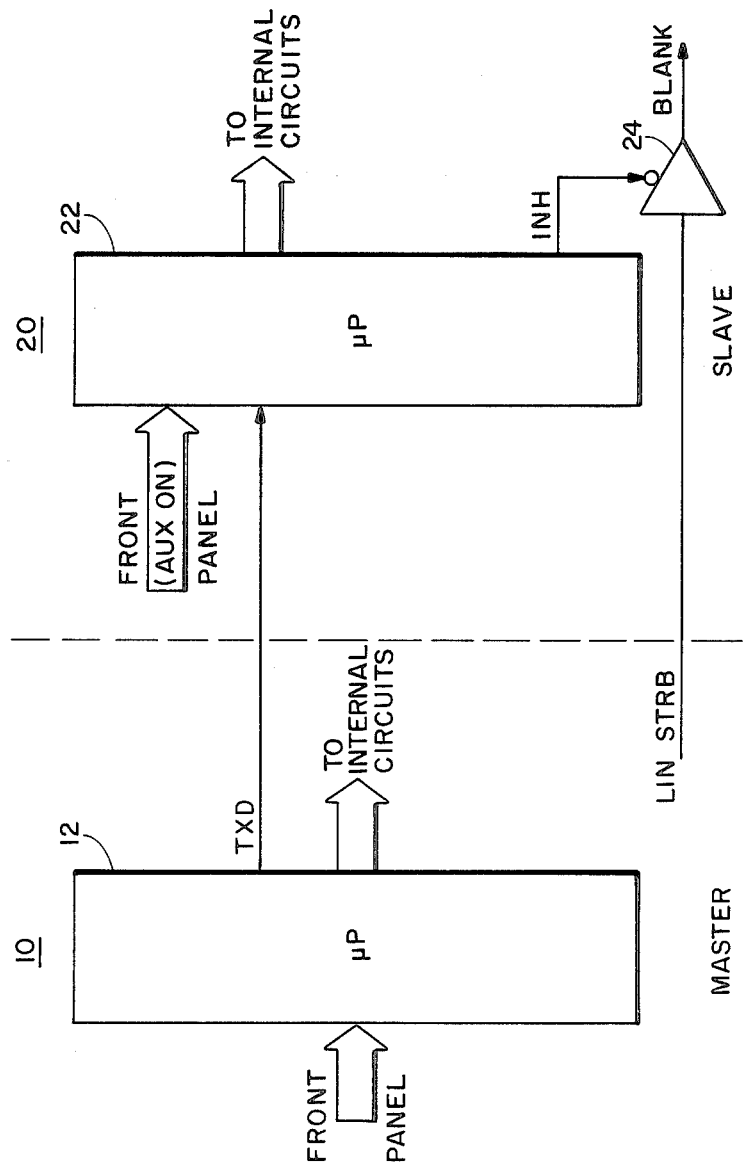
FIG. 1 is a block diagram of two instruments configured to operate in accordance with the method of this invention.

Referring now to FIG. 1 a first instrument 10 is shown in conjunction with a second instrument 20. Each instrument 10, 20 has its own respective microprocessor 12, 22. Input to each microprocessor 12, 22 are various operator controlled inputs from the front panel of the respective instruments 10, 20. A single transmission line TXD for commands connects the first microprocessor 12 with the second microprocessor 22 and commands are transmitted in one direction over this line. A line strobe line LIN STRB also runs between the first instrument 10 and the second instrument 20. LIN STRB is received in the second instrument 20 by a gate 24 which is controlled by an inhibit line INH from the second microprocessor 22 to provide a means for inhibiting the line strobe in the second instrument.

Figure 2:
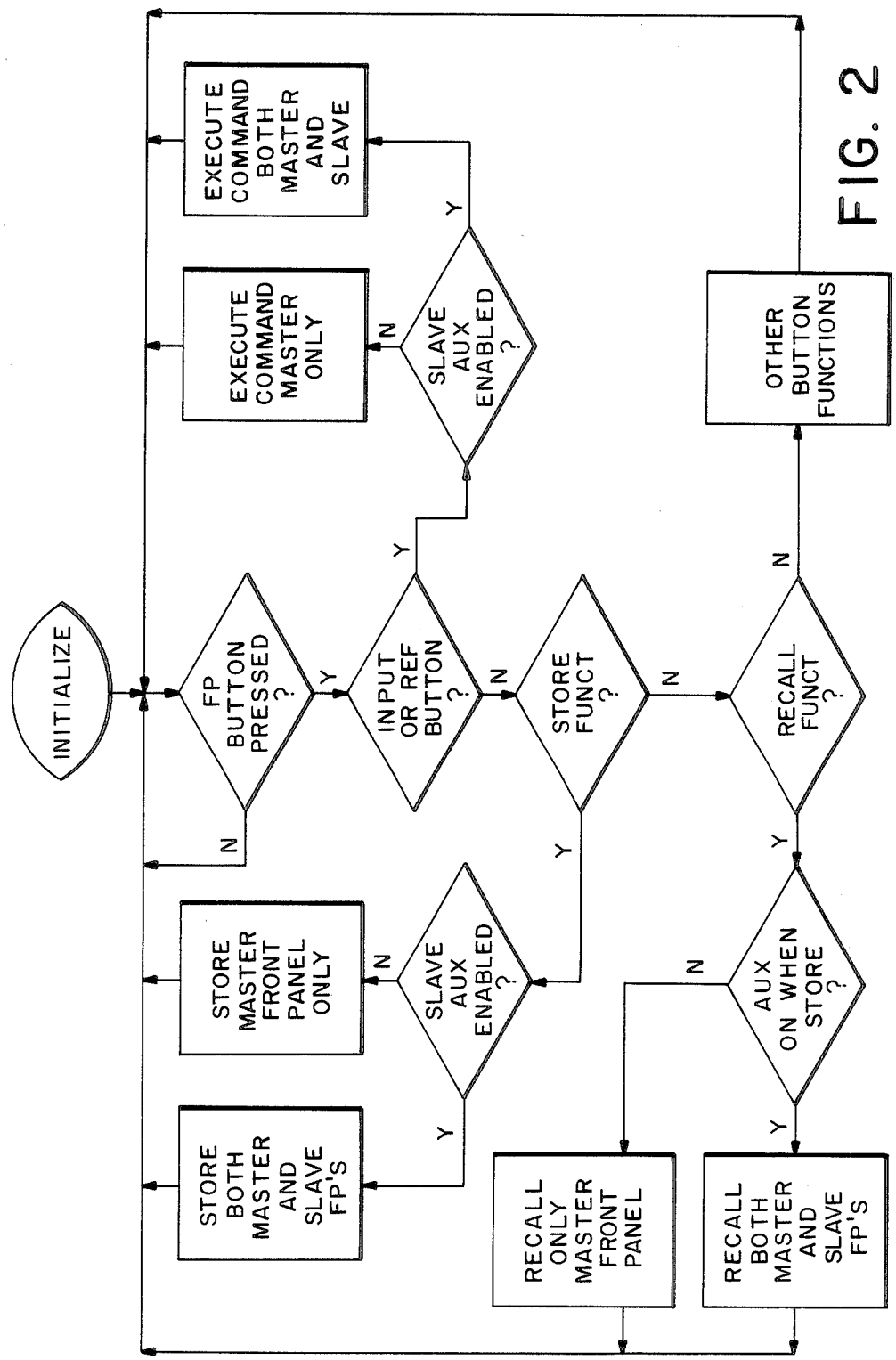
FIG. 2 is a flow chart of the operation of two instruments in accordance with the method of this invention.
Figure 3:
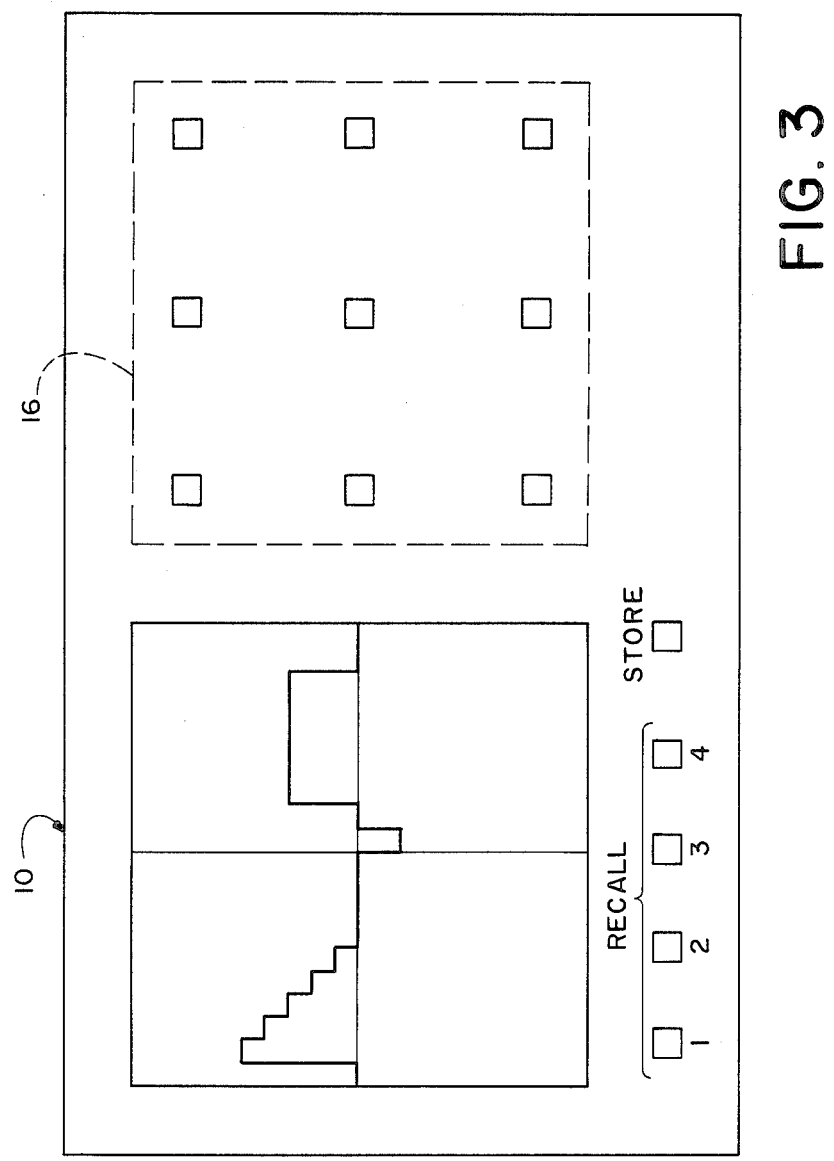
FIG. 3 is an illustrative plan view of a front panel for a master instrument according to the present invention.
Figure 4:
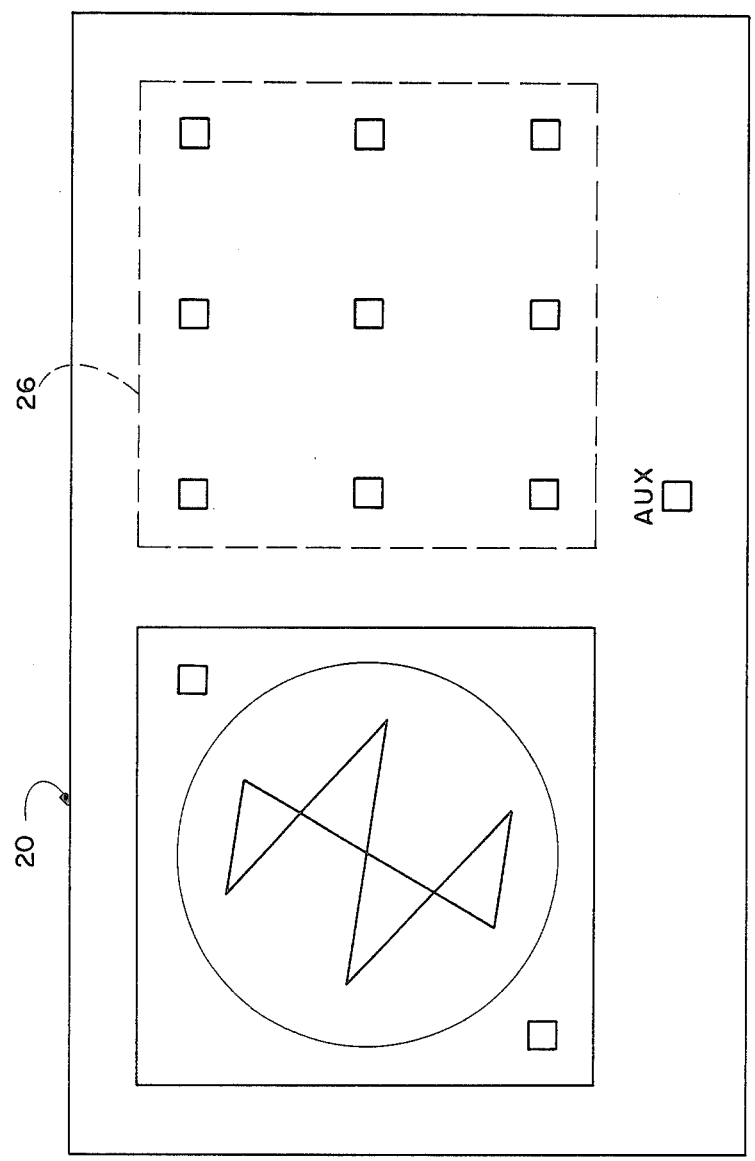
FIG. 4 is an illustrative plan view of a front panel for a slave instrument according to the present invention.

FIG. 2 demonstrates the operation of the two instruments 10, 20 together. In operation an operator sets up the instruments 10, 20 by means of respective front panel keyboards 16, 26 as shown in FIGS. 3 and 4. The master instrument 10 has additional controls for storing the setup and for assigning a recall number to the setup or for executing a stored recall as indicated by the buttons labeled STORE and RECALL, respectively. The slave instrument 20 also has an additional control button labeled AUX. To store the setup of the instruments the STORE button is depressed and then one of the RECALL buttons is depressed to assign a recall numer to the particular setup. If the AUX button on the slave instrument 20 is "on", then the STORE and RECALL buttons store and assign the same recall number to the its setup as well as the setup of the master instrument 10. The respective setups are stored in the respective microprocessors 12, 22. Each command executed on the front panel of the master instrument 10 is transmitted over TXD to the slave instrument. When the instruments are operated the operator first selects a particular preset setup by depressing one of the RECALL buttons corresponding to the desired setup. If AUX was "on" when that setup was stored, then the slave instrument 20 also will be set up. If AUX was "off" when the setup was stored, then depressing the RECALL button has no effect on the slave instrument 20.

Subsequent commands executed at the master instrument 10 are transmitted to the slave instrument 20 over TXD, but are only executed if AUX is "on". This includes the LIN STRB which will be inhibited in the slave instrument 20 if AUX is "off". Thus, the recall command will always be executed by the slave instrument if AUX was "on" when the setup for that recall number was stored, but subsequent commands will be executed by the slave instrument from the master instrument 10 only if AUX is "on" at the time of the command.

Although the above description involves microprocessors as the control devices, hardwired state machines could be used instead with concomitant reduction in flexibility.

Thus, the present invention provides a remote master-slave control method which transmits commands in one direction from the master instrument to the slave instrument, but which the slave instrument executes only if a flag is set in the slave instrument by the operator. Provision is also provided for storing setups for later recall if the flag is set during the setup.

We claim:
1. A remote master-slave system comprising:
   a master instrument having a controller with operator controlled inputs and a command line output;
   a slave instrument having a controller with operator controlled inputs and the command line from the master instrument as an input;
   means at the master instrument for storing instrument setups for the master instrument and the slave in- strument and assigning a recall number for each particular setup; and means at the slave instrument for inhibiting control by the master instrument.

2. A remote master-slave system as recited in claim 1 wherein the inhibiting means comprises an operator controlled input to the slave instrument which allows the slave instrument to follow the commands from the master instrument when "on" and inhibits the slave instrument from following the commands from the master instrument when "off".

3. A remote master-slave system as recited in claim 1 further comprising means for executing commands at the slave instrument in response to commands executed at the master instrument, the commands being transmitted over the command line, so long as the inhibiting means allows control by the master instrument.

4. A method for controlling a slave instrument from a master instrument, a single command line from the master instrument to the slave instrument connecting the instruments, comprising the steps of:

setting up the slave instrument and the master instrument;

storing the setups of the master instrument and the slave instrument and assigning a recall number to such setups by command over the single command line from the master instrument, the setup at the slave instrument being stored and assigned the recall number only if an operator controlled input at the slave instrument is "on";

executing the setups for a particular recall number by command from the master instrument; and transmitting commands to the slave instrument in response to commands executed at the master instrument, the commands being executed at the slave instrument only if the operator controlled input is "on".

5. A method for controlling a slave instrument from a master instrument over a single command line comprising the steps of:

transmitting a recall command to the slave instrument in response to execution of the recall command by the master instrument, the recall command having an identification assigned to it and being used to execute a prestored instrument setup;

executing the recall command at the slave instrument only if the identification was assigned when an operator controlled input at the slave instrument was "on" during storing of the prestored instrument setup;

transmitting commands to the slave instrument in response to commands executed at the master instrument; and executing the commands at the slve instrument only if the operator controlled input is "on" when the command is received by the slave instrument.

6. A remote master-slave system comprising:

a master instrument comprising means for inputting operator controlled parameter inputs for the master instrument and a command line output;

a slave instrument comprising means for inputting operator controlled parameter inputs for the slave instrument and the command line as an input;

means at the master instrument for causing execution of commands by the master instrument and for transmitting commands over the command line for execution by the slave instrument; and means at the slave instrument for inhibiting execution of the commands from the master instrument so that the slave instrument operates independently from the master instrument.

* * * * *